United States Patent
Jia et al.

[11] Patent Number: 5,991,402
[45] Date of Patent: Nov. 23, 1999

[54] METHOD AND SYSTEM OF DYNAMIC TRANSFORMATION OF ENCRYPTED MATERIAL

[75] Inventors: Zheng Jia, Germantown; Ji Shen, Gaithersburg, both of Md.

[73] Assignee: AegiSoft Corporation, Rockville, Md.

[21] Appl. No.: 08/935,955

[22] Filed: Sep. 23, 1997

[51] Int. Cl.⁶ ............................................. H04K 1/02
[52] U.S. Cl. ......................... 380/9; 380/9; 380/3; 380/4; 380/23; 380/25; 705/59; 713/164; 713/165; 713/166; 713/190
[58] Field of Search ................. 380/3, 4, 23, 25

[56] References Cited

U.S. PATENT DOCUMENTS

| | | | |
|---|---|---|---|
| 5,151,938 | 9/1992 | Griffin, III et al. | 380/43 |
| 5,388,211 | 2/1995 | Hornbuckle | 395/200 |
| 5,410,598 | 4/1995 | Shear | 380/4 |
| 5,537,143 | 7/1996 | Steingold et al. | 348/13 |
| 5,708,709 | 1/1998 | Rose | 380/4 |
| 5,717,756 | 2/1998 | Coleman | 380/25 |
| 5,758,069 | 5/1998 | Olsen | 395/187.01 |
| 5,764,762 | 6/1998 | Kazmierczak et al. | 380/4 |
| 5,790,663 | 8/1998 | Lee et al. | 380/4 |
| 5,805,706 | 9/1998 | Davis | 380/49 |
| 5,825,883 | 10/1998 | Archibald et al. | 380/25 |
| 5,826,011 | 10/1998 | Chou et al. | 395/186 |

*Primary Examiner*—Tod R. Swann
*Assistant Examiner*—Paul E. Callahan
*Attorney, Agent, or Firm*—Pennie & Edmonds LLP

[57] ABSTRACT

The present invention provides a method and system that enables software-on-demand and software subscription services based on a dynamic transformation filter technology. The invention is also useful in the distribution of other electronic material. The apparatus utilized in this invention does not create any intermediate storage of decrypted material that is under the protection of this technology. Instead, the apparatus is implemented as a virtually integral part of the operating system that monitors and "filters" all read, write, and open/execute access to and from the I/O devices, such as a hard drive. As the protected material is being accessed for read, write or open/execute, the transformation filter positions itself in the critical path which is required for loading the material through the low level file system layer to the high level application layer. The material enters the transformation filter in its encrypted state. The transformation filter decrypts the material in real-time as it goes through, and hands over the material in its original state to the upper level operating system component to fulfill the access requests. Because the need for intermediate storage is eliminated, the decrypted material in its original state is only visible to integral parts of the operating system components and not to other system users. As a result, security is significantly improved over prior art systems.

20 Claims, 4 Drawing Sheets

METHOD AND SYSTEM OF DYNAMIC TRANSFORMATION OF ENCRYPTED MATERIAL

BACKGROUND OF THE INVENTION

1. The Technical Field

This invention relates to metered usage of computer software and other intellectual property existing in electronic digital format. The end result of the invention enables services such as software-on-demand and software subscription. This invention can also be applied to the prevention of piracy of computer software and other intellectual property.

2. Description of the Prior Art

In the current consumer market, computer software and other intellectual property existing in digital format are primarily marketed the same as other hard goods commodities. However, while video tapes and other hard goods are rented routinely, software products typically are still available only on a purchase basis. As a result, at least two useful services generally are not available: software-on-demand and software subscription. Software-on-demand is a service that would allow consumers to pay for software products on a per-use basis. Software subscription is a service that would make one or more software products available to consumers on a periodic subscription basis such as once a month.

Despite the obvious benefits of these services, the inherent nature of software products has posed significant technical challenges to enabling technology providers. In order to successfully support these services, the enabling technology should meet the following criteria:

I. Security. Software product made available in software-on-demand and subscription format should be protected and regulated in a totally secure manner. The enabling technology must defend the software from the most skilled and determined hackers. In particular, at no time should the software in its original state be present on an intermediate storage medium, because this simply opens the door for skilled system level hackers. There is also the possibility that utilities would become available that would make such an intermediate storage medium accessible to the public.

II. Non-Intrusiveness. The enabling technology should not require modification of source code in order to protect and meter usage. In contrast, intrusive technology embeds itself in the source code of software products and requires recompilation of the software. This effort introduces significant overhead in the protection process in terms of extra coding and testing resources, and is highly error prone.

III. Minimal System Overhead. The enabling technology should not impose significant overhead while protecting, launching, and metering usage of the software product. Typical overhead introduced by enabling technology includes the need for extra RAM and hard disk storage space, the launching of the protecting process before decrypting protected software, and competition for other system resources, such as the CPU, while monitoring usage.

IV. Immunity From System Clock Reset. By altering a computer system's clock setting, users of software products can significantly prolong their allowed usage period and consequently compromise the effectiveness of software-on-demand and software subscription services. The enabling technology should be able to detect and take counter-measure actions against system clock resets.

V. Perpetual Protection And Metering. Once a software publisher puts his software under the protection and control of the enabling technology, it should be perpetually protected and controlled. Subsequent copies and reinstallation should not disable the protection and control.

VI. User Friendliness. The enabling technology should not alter a computer user's environment in a way that causes changes in system settings that are noticeable to the user. The user interface should be totally intuitive and easy to use.

Available prior art protection techniques are based on "wrapper" and "redirection" technologies. A "wrapper" often takes the form of a operating system shell program or an altered start-up code section of the protected software. Its function is to shield direct access to the protected software. When the protected software is accessed by users, the "wrapper" will be executed first. The protected software in its encrypted state will be then decrypted and restored on a temporary storage medium in its original state. The "wrapper" will then redirect the access to the restored software on the temporary storage medium.

A system developed by TestDrive Corporation in Santa Clara, Calif., offers try-before-buy software evaluation services. This system converts an original version of software to a disabled version that may be used for a limited trial or evaluation period. If purchase of software is desired, an unlock code may be purchased that converts the software to its original state. In a preferred embodiment, this prior art system is applied to chosen material, such as a computer program, and a portion of the material is separated from the original material. In this way, a denatured version of the original material that includes the separated portion of the material and the residual portion of the material is produced. During the trial period, the denatured version of the material is placed into a temporary storage medium but only the separated portion is readily accessed by a system user. Alternatively, the separated portion of the material may be replaced with a modified portion, for example, a counter may be included to limit the number of times the material may be accessed, or interfering material may be added to the original material, such as beeps in an audio signal, or a mask in a visual signal.

Several drawbacks in these "wrapper" and "redirection" technology based systems are obvious.

I. Security flaw. Since "wrapper" and "redirection" technology requires a temporary storage medium to physically host either all the restored software or the residual portion of the software in its original state, the very existence of the material in its original state accessible by a system user makes the system vulnerable to hacker attacks. It is possible for an operating system expert to gain access to the material in its original state and redistribute a pirated version of the material. A utility software program could also possibly be developed to perform this act of piracy repeatedly and can be made available in the public domain to further damage the effectiveness of the enabled services. While wrapper and redirection technologies can protect software from novice attacks, they are not highly secure against experts.

II. System overhead. Launching the "wrapper" program, physically storing the restored software in its original state, and creating and administrating the temporary storage medium all impose delay before launching the user desired software product. These activities also compete for other system resources with other processes run by the operating system.

III. Space overhead. Storage of the restored software product in its original state in Random Access Memory (RAM)

will require greater than 100% more RAM space than the protected software normally requires. In a multiple process operating system, where multiple protected software can be executed simultaneously, this overhead requirement can be multiplied and significantly impact the system's performance.

IV. Unwelcome Nuisance. The creation of a temporary storage medium in a computer system, such as a virtual device, is an artifact normally unwelcome and foreign to computer system users. Therefore, the user will eventually want to purchase the original material in its entirety to eliminate the nuisance and artifacts generated by wrapper and redirection technologies. Thus, these technologies do not lend themselves to providing perpetual usage metering and protection services.

Currently there is no known highly secure method that provides real time decryption of encrypted software or other electronic material without redirecting and storing the decrypted material on a temporary medium.

SUMMARY OF THE INVENTION

The present invention provides a method and system that enables software-on-demand and software subscription services based on a dynamic transformation filter technology. The invention is also useful in the distribution of other electronic materials. The apparatus utilized in this invention does not create any intermediate storage of decrypted material that is under the protection of this technology. Instead, the apparatus is implemented as a virtually integral part of the operating system that monitors and "filters" all read, write, and open/execute access to and from the I/O devices, such as a hard drive. As the protected material is being accessed for read, write or open/execute, the transformation filter positions itself in the critical path which is required for loading the material through the low level file system layer to the high level application layer. The material enters the transformation filter in its encrypted state. The transformation filter decrypts the material as it goes through, and hands over the material in its original state to the upper level operating system component to fulfill the access requests. Because the need for intermediate storage is eliminated, the decrypted material in its original state is only visible to integral parts of the operating system components and not to other system users. As a result, security is significantly improved over prior art systems.

The transformation filter is formed by converting a programmable service that is provided by the operating system for a totally different purpose into a "filtering" security and regulating system. Preferably, in the case of Windows 95™ software, this programmable service is a virtual device driver; and in the case of Windows NT™ it is a kernel mode driver.

The present invention can operate with material that is not intrusively embedded inside the protected material. It provides an utility that encrypts any material with a few easy to follow steps. The invention adopts standard data encryption mechanisms made available by the U.S. government and commercial companies. However, the apparatus in this invention provides enhanced key management capabilities to further ensure security of the encrypted material. All material installed on the consumer's PC goes through two encryption processes. The second encryption process requires a dynamically unique key generated from the computer user's unique ID. The dynamic generation of the key ensures that no unlocking key can be obtained directly from files stored on the hard disk.

The present invention make it possible for the transformation filter to perpetually regulate, meter, and charge for the usage of software products and other intellectual property existing in digital format. Such material can be ordered on-demand multiple times and can also be available on a subscription basis. Copying of the installed material to other computers will only produce an encrypted version of the material. However, a permanent copy of the decrypted material can be generated at the discretion of its publisher.

The invention provides components of the system that allows users of such material to connect via a modem or existing private network, and Internet connection to a clearing house server. The clearing house server will in turn generate an authorization code for enabling metered usage of the material upon receiving an order and a charge card number. Currently acceptable charge cards include regular credit cards and debit cards. Future payment methods will illustratively include smart cards and digital cash. These components of the system will also be able to process customer returns and exchanges.

The present invention is able to operate with material distributed via all possible channels, such as electronic material distribution over the Internet, CD-ROMs distributed at physical store fronts, DVDs, VCDs, cable modem, and other broadcasting channels.

The present invention also operates in an network environment where access to material over a network file system is equally regulated and metered by the system.

BRIEF DESCRIPTION OF THE DRAWINGS

These and other objects, features and advantages of the invention will be more readily apparent from the following detailed description of the invention in which.

DETAILED DESCRIPTION OF THE INVENTION

The current invention is a method and apparatus that is integrated into the internals of an operating system, such as Microsoft Windows 95 or Window NT. This method and apparatus enables dynamic decryption of encrypted material in real time without redirection to a temporary storage medium. Consequently the invention allows software products and other materials in electronic format to be protected through encryption and to be made available for regulated and metered usage.

In the preferred embodiment of the present invention, a transformation filter is implemented as a kernel level program operating in a multi-process operating system environment; and the encrypted material is application software. However, the invention may also be applied to other contexts such as the distribution of audio or visual materials in encrypted form.

Figure 1:
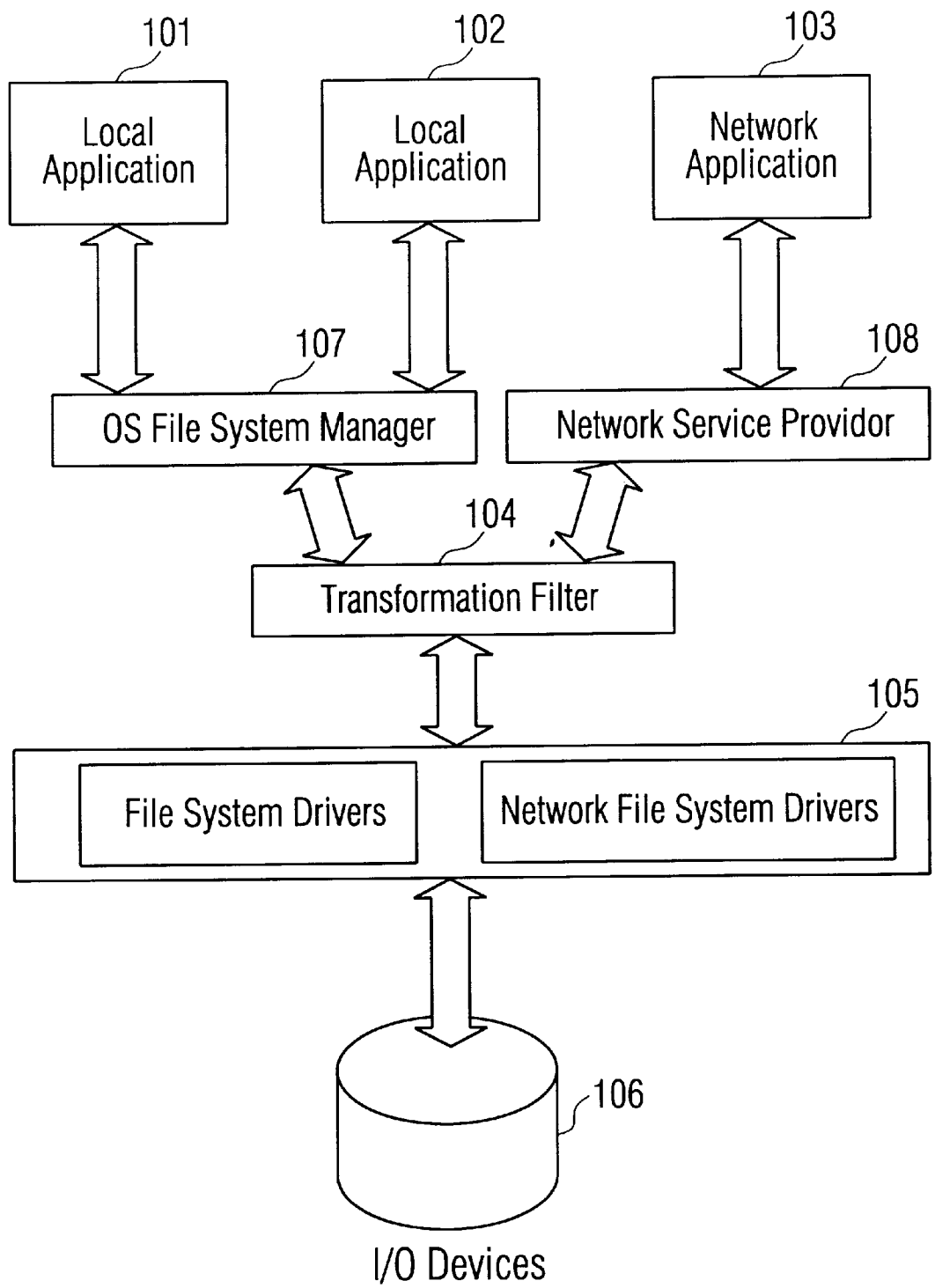
FIG. 1 is a high level architecture diagram depicting components of the system, their relative positions and inter-relationships and the direction of data flow.

FIG. 1 is a high level architecture diagram depicting the position and function of the transformation filter within the operating system.

High level application programs, including local applications and network applications 101, 102, 103, request access to software materials residing on system I/O devices 106 to perform read, write, and open/execute activities. These requests must be submitted to the operating system components like an OS file system manager 107 or a network service provider 108, and be relayed to a file system driver layer or a network file system driver layer 105 which is also on the kernel level. In accordance with the invention, a transformation filter 104 is positioned between the applications 101, 102, 103 and the file system driver layer 105. Illustratively, in the context of Windows 95™ Software, the transformation filter is implemented as a virtual device driver; and in the case of Windows NT™ it is implemented as a kernel mode driver.

If access requests coming from local and/or network applications to file system drivers are considered to be going "downstream", then all data being read from I/O devices to upper layers of the operating system are considered to be going "upstream". Both downstream (from application down to file system) and upstream (from file system to application) data must go through a particular path which is referred to as the critical path in this document. Transformation filter 104 is in the critical path.

Whenever data passes through the transformation filter in an upstream direction, the transformation filter performs the necessary transformation that converts the encrypted software into its original state. The software that has been transferred to its original state is then handed over to upper layers of the operating system. If the request is from an application, e.g., an image viewer to open a file for display, the transformed software material will eventually be handed over to the application. From the requesting application's perspective, opening this encrypted software material is no different from opening any other original software material. The transformation process is totally transparent to the requesting application. If the request is to execute the file (e.g., double mouse clicking on the file) and the original software material is an executable program, the transformed software will be handed over to the operating system's loader to execute in memory. This process is considered "filtering" because encrypted software moving upstream goes into the apparatus and comes out in its decrypted state as if it went through a filtering device. No intermediate storage of the decrypted software is ever exposed to system users during the whole "filtering" process. All handing-over and decrypting processes take place inside the operating system as internal activities in a highly secure fashion.

Transformation filter 104 is implemented as if it were an integral part of the operating system. Extra security measures are built into transformation filter 104 so that it not only is capable of "filtering" upstream and downstream data, but also monitors hacking activities within the operating system and takes countermeasures to prevent any security breaches from taking place.

Figure 2:
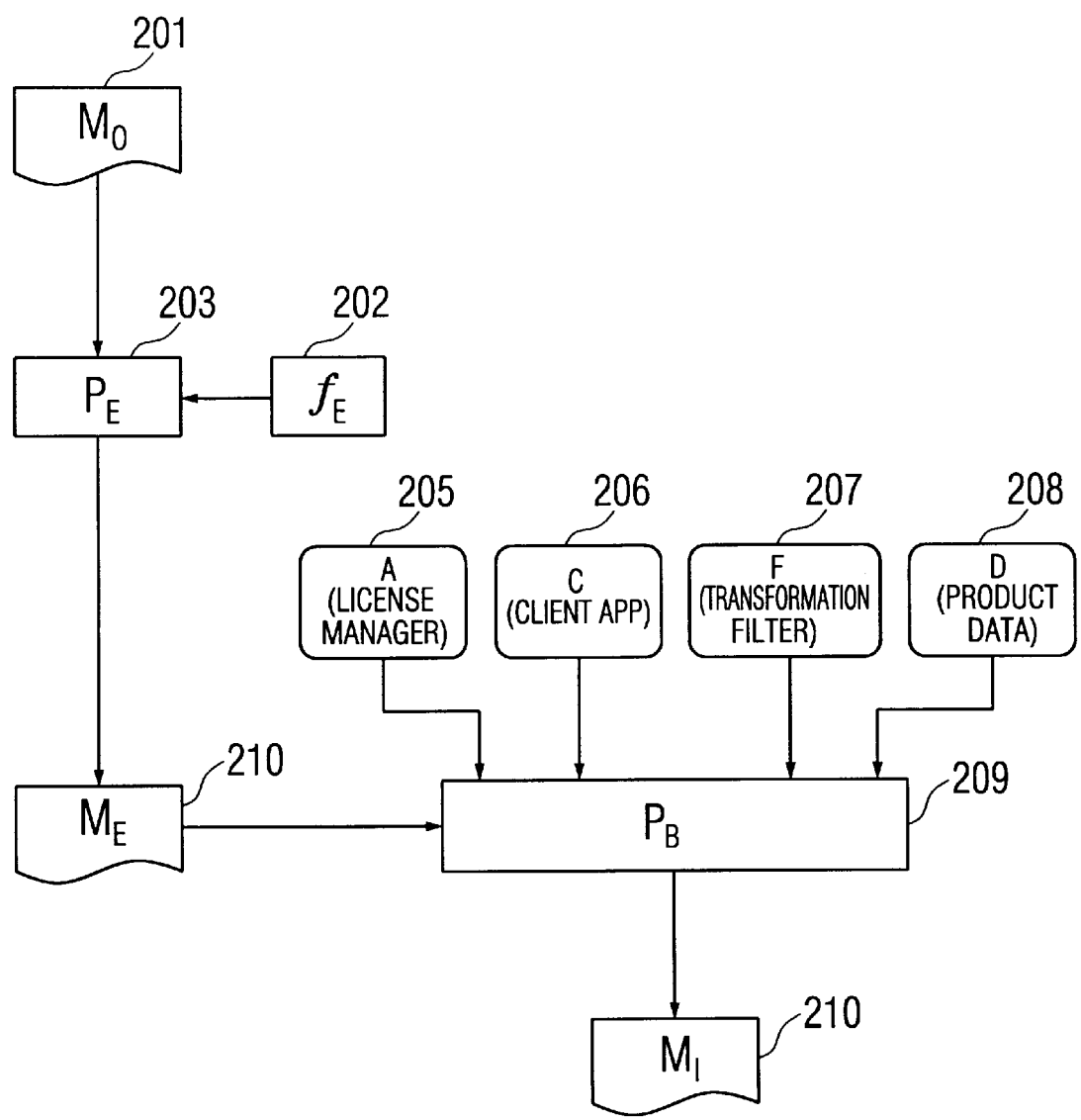
FIG. 2 depicts the process of encrypting and packaging of original material into a protected state.

FIG. 2 is a block diagram depicting the process of encrypting the original software material into its pre-installed encrypted stage. As shown in FIG. 2, original software material $M_O$ 201 is encrypted by application of a transformation function $f_E$ 202 in an encryption process $P_E$ 203. The encryption process preferably is a standard encryption process such as DES or RSA. The result of this encryption process is encrypted software $M_E$ 204, which may be transmitted securely over various distribution channels, such as CD-ROMs, the Internet, and others.

During a second process $P_B$ 209, four other components that support successful regulation and metering of the software's usage are added to $M_E$ 204. These components are a license manager 205, a client application 206, a transformation filter 207, and a product specific signature data 208. License manager 205 is a software program that is responsible for maintaining a license database including data on usage of the encrypted software, interfacing with users of the encrypted software material $M_E$, and terminating usage of the encrypted software material upon expiration of an authorized usage period. Client application 206 is a software program that is used to request from a clearinghouse server authorization to use the encrypted software material $M_E$, and to receive from the clearinghouse server an appropriate authorization code. This activity may also involve some form of electronic payment, such as provision of a credit or debit card number. In addition, the client application may also include the capability of obtaining pricing, promotion and upgrade information and downloading additional software. Transformation filter 207 is the software which controls access to the encrypted software material $M_E$. Further details of this software are described in conjunction with FIGS. 1 and 4. Product specific signature data 208 is a code unique to the particular encrypted software material $M_E$.

The output of process 209 is a single output file $M_I$ 210, which is the pre-installation encrypted software material and comprises all the input components 204, 205, 206, 207, 208. Process 209 preferably just combines components 204, 205, 206, 207, 208 into a single software product. Alternatively, process 209 could also involve an additional encryption process.

In the preferred embodiment of the invention, output file $M_I$ takes on the name, icon and other properties of the original software material. Therefore, from an external point of view, this file appears to be identical to the original software. This embodiment is primarily for the purpose of eliminating extra steps for software publishers in packaging their software products.

Subsequently, software publishers can use their favorite installation packaging utility, such as InstallShield™, to put their software into a normal installation package as if the encryption processes of FIG. 2 had never taken place.

Figure 3:
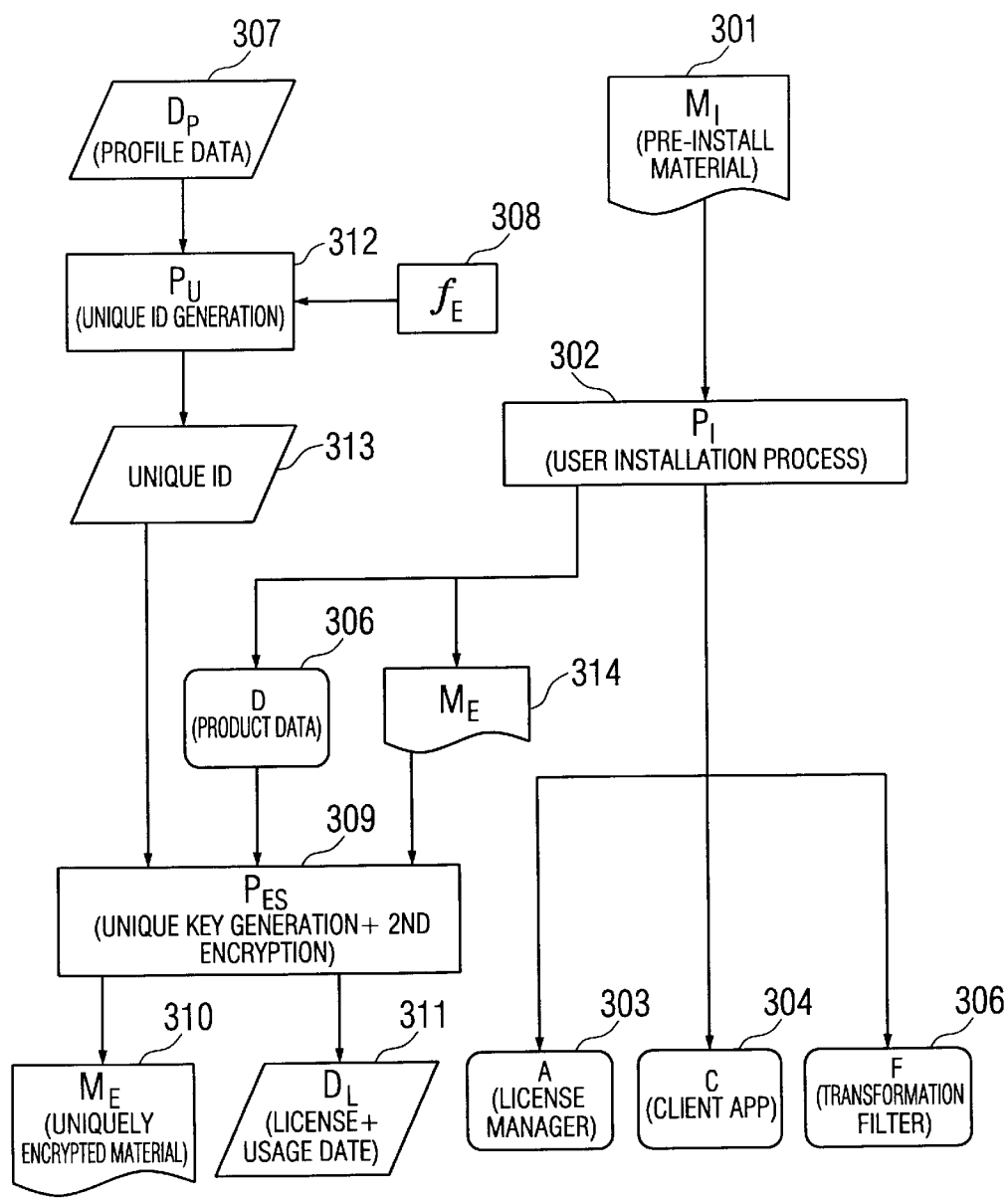
FIG. 3 depicts the process of installing the protected product onto a user's computer, including the generation of a unique ID and a second encryption with a user unique key.

FIG. 3 is a block diagram depicting the process of installing encrypted software material onto a user's PC. In a preferred embodiment, output file $M_I$ launches its own installation process 302 after a user goes through normal procedures for installing the software just as if the software had never been encrypted. Installation process $P_I$ 302 spawns off the key components of the pre-installation software material $M_I$ 210/301. First, a license manager 303, a client application 304 and a transformation filter 305 are extracted and installed in proper hidden places in the system. Product specific signature data 306 and the encrypted software $M_E$ are also obtained.

Simultaneously, user profile data and operating system specific information, represented as $D_P$ 307 is transformed by a transformation function $f_1$ 308 in process $P_U$ 312 to generate a unique ID 313 for the customer. Any number of conventional techniques can be used in process 312 to generate unique ID 313. Advantageously, we prefer to use a time stamp with a precision measured in milliseconds in generating the unique ID because the probability that two users will install their software at the same millisecond is virtually zero. Unique ID 313 is subsequently used in all phases and components of the system.

Product specific signature data 306, unique ID 313 and the encrypted software $M_E$ are supplied to a process $P_{ES}$ 309. Process $P_{ES}$ uses the inverse of the transformation function $f_E$ to decrypt the software material and thereby restore the original material $M_O$. Such decryption processes are well known. Then, it immediately re-encrypts $M_O$ with a unique encryption key based on the unique ID 313 and the product specific signature data 306. Again, standard encryption processes such as DES or RSA may be used. The result is a uniquely encrypted software material $M_U$ 310. The software material $M_U$ is then installed above driver layer 105 (See FIG. 1).

In the preferred embodiment, the invention never stores the unique encryption key used for the generation of $M_U$. Whenever necessary, this unique key can be dynamically regenerated using the same inputs (the unique ID and the product specific signature data) and key generation process. This key management strategy makes it extremely difficult to compromise the encrypted software material. The uniqueness of the key also assures that no identical encrypted software material exists on any two user's computers once the software is installed.

At the end of installation, a license database DL 311 is generated that keeps all license information, a usage counter, and other important information to successfully implement a usage regulation and metering process described below in conjunction with FIG. 4. The license database identifies the encrypted software as being "registered", that is, being subject to the system of the present invention. The database is also stored in the computer system.

Referring to FIG. 1, transformation filter 104 is installed in the computer system so that it intercepts all requests to access software files resident on I/O devices 106. In the Windows 95™ operating system this is accomplished by installing the transformation filter as a virtual device driver. In the Windows NT™ operating system this is accomplished by installing the transformation filter as a kernel mode driver.

User activities such as read, write, execute the software or open software material for viewing are processed by the operating system. A higher level operating system process (e.g., a local or network application 101, 102, 103 of FIG. 1) is responsible for passing a request for such activities downstream to driver layer 105 through transformation filter 104.

Figure 4:
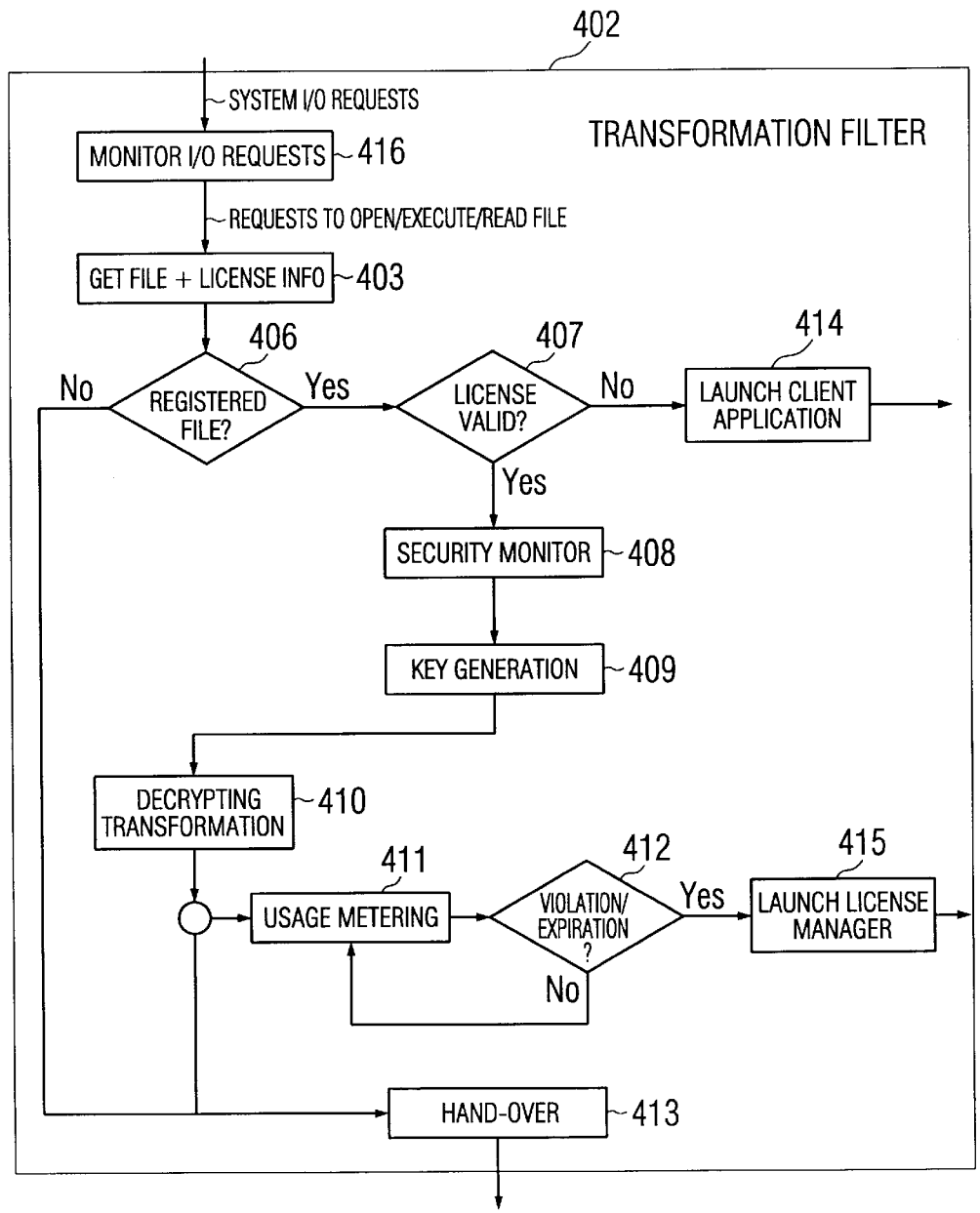
FIG. 4 is a flowchart depicting the internal process flow of the transformation filter.

FIG. 4 illustrates the detailed internal process flow of the transformation filter. As indicated by box 416, the transformation filter continuously monitors the operating system for all I/O requests. When such a request reaches the transformation filter, it initiates the get software+license info process 403. This process obtains the license information (if any) for the requested software including the latest status on the software's usage, license, authorization code, expiration date, product specific signature data 208/306, along with other pertinent information. Subsequently, two validation tests are applied: a test if the software is registered (step 406) and a test if the license is valid (step 407). If the requested software was not registered, the transformation filter simply transfers control back to the operating system's requesting process at step 413 without taking any further actions. If the software is registered, the transformation filter checks at step 407 whether there is a valid license for it. In case there is no valid license, a client application is launched at step 414 to prompt the user to order more usage or purchase the software.

The order entry process is handled by the client application component of the system. The client application connects the user's computer to a clearinghouse server via a modem or existing Internet connections. The clearinghouse server, upon receiving a valid credit card or debit card number, in turn generates an authorization code to activate legitimate usage of the registered software.

If a valid license for the software is present and the execution is within the authorized usage period, the transformation filter starts a security monitor process 408 to perform a scan of any third party processes that might be attempting to hijack data going out of the transformation filter after being decrypted. In case that suspicious activity is present in the operating system, the transformation filter takes countermeasures to eliminate the potential threat.

Next, the unique key to be used to decrypt the encrypted software is generated in key generation process 409. This key is generated from the unique ID 313 and the product specific signature data 306. Using the generated decryption key and the inverse of encryption process 309, the transformation filter then decrypts in real-time all the encrypted portion of the software in the decrypting transformation process 410. The decrypted software in its original state is then handed-over at step 413 to the requesting process. The operating system may now successfully process the execution or feed the decrypted software material to an application that requested access.

Once the decrypted software is handed-over to the requesting process, the transformation filter starts a usage metering counter at step 411. While the usage counter runs, the transformation filter continually tests at step 412 the amount of usage for a violation of the license terms or expiration of the license. In case there is a violation of the terms of the license for the software or the license has expired, the transformation filter starts a process at step 415 to launch the license manager. The license manager is responsible for properly maintaining and updating the license database, and interacting with the user by prompting him with various messages and taking in the user's feedback. Whenever necessary, the license manager is responsible for terminating usage of the registered software material after given the user warnings and a reasonable amount of time to respond. The license manager may transfer control to the client application to prompt the user to order more usage when the license expires.

The present invention enables the whole process of encrypting, registering, ordering, activating, decrypting, regulating and metering the usage of software materials. Business services that will benefit consumers, including but not limited to, software-on-demand, software rental, software subscription, try-before-buy, can be adequately supported by the method and system of this invention.

Two examples of the application of the invention in the provision of software are software-on-demand and software subscription services.

The essence of software-on-demand services is to make software available at the consumer's finger tip whenever the consumer desires to use the software. The software material made available through this service can be application software, such as accounting software, games, education and entertainment software, CAD software, etc. The software material can also be any electronically stored material such as audio, video, other forms of multimedia content, or it simply takes the form of plain binary or text file. This service is supported by the invention in the following way:

1. A publisher uses the invention to encrypt his software materials following the steps of FIG. 1. The encrypted software material becomes a registered software known to a clearinghouse server.
2. The software material is then packaged using any commercially available installation packaging software, for example InstallShield. Multiple programs or other software material from one or several publishers may be combined in one software package.

3. The software material is distributed to users through various channels, such as the Internet/WWW, CD-ROM, DVD, or VCD.

4. The user choose from an online based electronic catalog listing all available material in the software package. He or she decides to install one or more software programs or other material onto his or her computer following the steps of FIG. 2.

5. The user then decides to use one of the software programs or other material.

6. The user issues an execute command or invokes an application to access the software program or other material.

7. The user is prompted via the client application to pay for such usage with a credit card or other type debit card number.

8. The user is connected to a clearinghouse server facility via modem or over Internet connection. If there is a firewall (for corporate users), the invention will operate with the procedure to pass through the authorization process of the firewall.

9. The user reviews pricing information retrieved from the clearinghouse server by the client application.

10. The user confirms the order.

11. The clearinghouse server issues an authorization code.

12. The authorization code activates the desired software material. The usage counter is updated to record this ordering session.

13. The user reissues the execution or access command.

14. The transformation filter dynamically perform the necessary transformation to enable proper usage of the software material.

15. Usage is metered and regulated by the license manager application.

Software subscription services follow the similar steps of software-on-demand services, except the payment for the services is on a monthly basis. Users also normally have the option of using multiple products every month.

Another example of the application of the invention is in the distribution of audio/visual or textual material. Such material may be encrypted, prepared and distributed in essentially the same fashion as application software. The user then selects the material he wants to see or hear and obtains it in a fashion similar to the way he obtains the software except that in this case the visual material is displayed and the audio material is used to drive a speaker system.

What is claimed:

1. A method of operating a virtual device driver or kernel mode driver to control the usage of encrypted material that has been installed on a computer comprising the steps of:

monitoring all requests for access to the encrypted material;

upon receiving a request for access to the encrypted material, obtaining the encrypted material;

determining if a license exists to use the material;

if a license exists, decoding the encrypted material in real-time;

monitoring how much the decoded material is used; and determining if the usage of the material complies with the license.

2. The method of claim 1 wherein the encrypted material is encrypted using a first key that is unique to a user and a second key that is unique to the material that is encrypted.

3. The method of claim 2 wherein the first key includes a time stamp.

4. The method of claim 3 wherein the time stamp has a precision measured in milliseconds.

5. The method of claim 2 further comprising the step of generating from the first key and the second key a third key for use in decoding the encrypted material.

6. The method of claim 1 wherein the encrypted material installed on the computer is encrypted by decrypting a first version of the material to produce an unencrypted version and then re-encrypting the material using a first key that is unique to a user and a second key that is unique to the material that is encrypted.

7. The method of claim 1 further comprising the step of obtaining a license to use the material if it is found that a license does not exist.

8. The method of claim 1 further comprising the step of performing a security check of the computer before decrypting the encrypted material.

9. The method of claim 1 wherein the encrypted material is a computer program.

10. The method of claim 1 wherein a software package is installed on the computer, said software package comprising an encrypted portion, a unique code, and decrypting software for decrypting the encrypted portion, said method further comprising the steps of:

separating from the software package the encrypted portion, the unique code and the decryption software;

storing said decryption software so that it is invoked whenever an attempt is made to access the encrypted portion;

generating a unique ID from profile data and an encryption algorithm;

decrypting the encrypted portion of the software to produce an unencrypted portion;

encrypting the unencrypted portion using the unique ID and the unique code to produce a second encrypted portion; and storing said second encrypted portion in said computer.

11. The method of claim 10 wherein the unique ID includes a time stamp.

12. The method of claim 11 wherein the time stamp has a precision measured in milliseconds.

13. A method for installing software on a computer, said software comprising an encrypted portion, a unique code, and decrypting software for decrypting the encrypted portion, said method comprising the steps of:

separating from the software the encrypted portion, the unique code and the decryption software;

storing said decryption software so that it is invoked whenever an attempt is made to access the encrypted portion;

generating a unique ID from profile data and an encryption algorithm;

decrypting the encrypted portion of the software to produce an unencrypted portion;

encrypting the unencrypted portion using the unique ID and the unique code to produce a second encrypted portion;

storing the second encrypted portion in said computer.

14. Apparatus as implemented in a virtual device driver in a computer operating system for operating a computer on which encrypted material has been stored comprising:

means for monitoring all requests for access to the encrypted material;

means for obtaining the encrypted material upon receiving a request for access to said material;

means for determining if a license exists to use the material;

means for decoding the encrypted material in real-time if a license exists;

means for monitoring how much the encrypted material is used; and means for determining if the usage of the material complies with the license.

15. The apparatus of claim 14 wherein the encrypted material is a computer program.

16. A method of operating a computer comprising the steps of:

installing on the computer a software package, said software package comprising an encrypted portion, a unique code, and decrypting software for decrypting the encrypted portion, said step comprising the steps of:

separating from the software package the encrypted portion, the unique code and the decryption software;

storing said decryption software so that it is invoked whenever an attempt is made to access the encrypted portion;

generating a unique ID from the profile data and an encryption algorithm;

decrypting the encrypted portion of the software to produce an unencrypted portion;

encrypting the unencrypted portion using the unique ID and the unique code to produce a second encrypted portion; and storing the second encrypted portion in said computer; and after the software package has been installed, monitoring all requests for access to the second encrypted portion;

upon receiving a request for access to the second encrypted portion. obtaining said portion;

determining if a license exists to use said portion;

if a license exists, decoding the second encrypted portion in real-time;

monitoring how much the decoded portion is used; and determining if the usage of the decoded portion complies with the license.

17. The method of claim 13 wherein the unique ID includes a time stamp.

18. The method of claim 17 wherein the time stamp has a precision measured in milliseconds.

19. Apparatus as implemented in a kernel mode driver in a computer operating system for operating a computer on which encrypted material has been stored comprising:

means for monitoring all requests for access to the encrypted material;

means for obtaining the encrypted material upon receiving a requests for access to the encrypted material;

means for determining if a license exists to use the material;

means for decoding the encrypted material in real-time if a license exists;

means for monitoring how much the encrypted material is used; and means for determining if the usage of the material complies with the license.

20. The apparatus of claim 19 wherein the encrypted material is a computer program.

* * * * *